May 29, 1934.   S. G. RUSSELL ET AL   1,960,286
FISHING REEL
Filed July 28, 1933
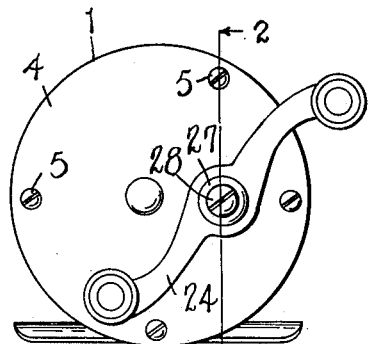
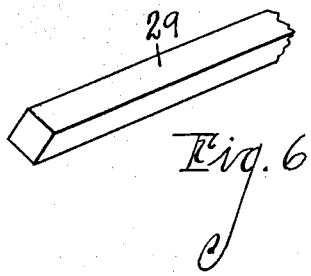
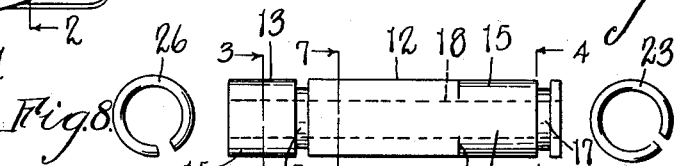
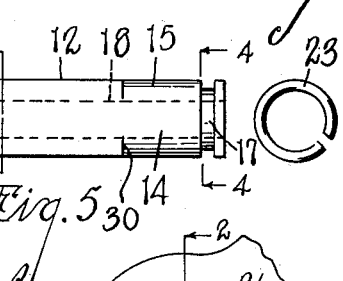
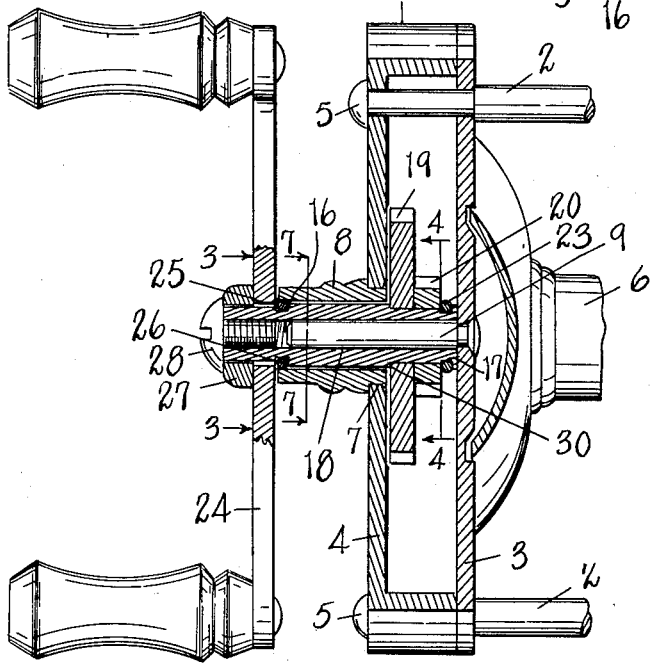
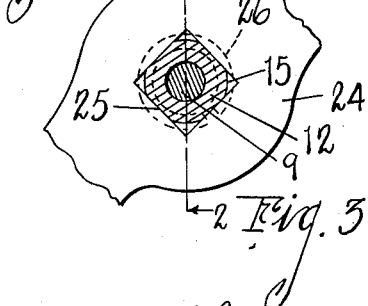
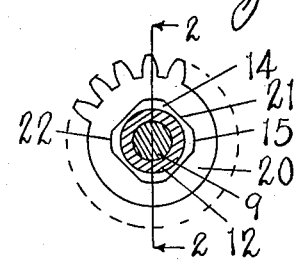
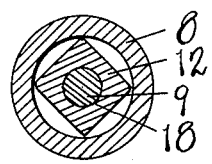
INVENTOR
Samuel G. Russell
BY Earle D. Clickner
Chappell & Earl
ATTORNEYS Patented May 29, 1934

1,960,286

UNITED STATES PATENT OFFICE 1,960,286

FISHING REEL

Samuel G. Russell and Earle D. Clickner, Kalamazoo, Mich., assignors to Shakespeare Company, Kalamazoo, Mich.

Application July 28, 1933, Serial No. 682,545

7 Claims. (Cl. 242—84.1)

The main objects of this invention are:

First, to provide a fishing reel having a crank, shaft and gear assembly formed of parts which may be inexpensively manufactured from readily available stock by automatic machines in quantity production.

Second, to provide an assembly of this character which may be easily taken apart for the repair and/or replacement of parts.

Third, to provide a reel having the above desirable features and characteristics, which is simple and economical in its parts and very efficient and effective in operation.

Objects relating to details and economies of structure will appear from the description to follow. The invention is defined and pointed out in the claims.

A structure which is a preferred embodiment of our invention is illustrated in the accompanying drawing, in which:

Fig. 1 is a view in end elevation of a fishing reel embodying the features of our invention.

Fig. 2 is an enlarged fragmentary vertical section on a line corresponding to line 2—2 of Figs. 1, 3 and 4.

Fig. 3 is a fragmentary detail section on line 3—3 of Figs. 2 and 5.

Fig. 4 is a fragmentary detail section on line 4—4 of Figs. 2 and 5.

Fig. 5 is a view in side elevation of the shaft.

Fig. 6 is a fragmentary perspective view of a piece of square stock from which the shaft is formed.

Fig. 7 is a detail section on line 7—7 of Figs. 2 and 5.

Figs. 8 and 9 show the assembling rings.

In the embodiment of our invention illustrated, the fishing reel frame designated generally by the numeral 1 comprises the pillars 2, the end plate 3, and the head plate 4, the head plate being flanged and coacting with the end plate in providing a chambered head. The pillars are shouldered to receive the plates 3 and 4, the parts being held in assembled relation by the screws 5 tapped into the ends of the pillars.

The spool 6 is suitably journaled in the frame. The head plate has an opening 7 in which the thimble 8 is secured. The staff or spindle 9 is mounted on the end plate 3 to project centrally of the sleeve or thimble 8.

We provide a shaft 12 preferably formed of square bar stock as indicated in Fig. 6 where the stock is designated by the numeral 29. This shaft is formed as a complete screw machine job and has portions of the corners thereof turned off providing an outer crank receiving portion 13 and an inner gear receiving portion 14, the rounded or turned off corners of these portions being indicated at 15. The shaft has annular grooves 16 and 17 respectively at the inner ends of these portions 13 and 14. The shaft has a longitudinal bore 18 receiving the staff so that the shaft is rotatably supported by the staff and centrally relative to the thimble 8.

A pair of gears 19 and 20 are provided with central openings 21 fitting the gear receiving portion 14 of the shaft. These openings 21 may be punched in the gear, the corners being left rounded or with fillets 22 therein which naturally result from the punching operation. One of the gears is supported by the shoulders 30 resulting from the turning off of the corners of the square stock.

The split ring 23 is engaged in the groove 17 serving to lock the gears on the gear receiving portion 14, at the same time permitting the ready removal thereof should replacement be desired.

The crank 24 is provided with a punched opening 25 fitting upon the crank receiving portion of the shaft.

A split ring 26 is disposed in the annular groove 16 and constitutes an annular abutment for the crank.

The collar or washer 27 is arranged on the shaft at the outside of the crank and the screw 28 is threaded into the bore for clamping the crank in position and against its abutment.

As stated, the shaft is formed from a bar of square stock by an automatic screw machine in one operation and is very inexpensive to produce, inasmuch as there are several operations eliminated that have hitherto been necessary to perform on fishing reel gear structures, the structure being especially desirable for embodiment in low priced reels as the items of stock or material, machining, and assembling are small, and at the same time the structure is a satisfactory one.

The crank is supported so that it is well adapted to receive the thrusts and strains to which it is subjected in use. The gears are also effectively supported, and at the same time may be readily removed and replaced should occasion require.

The other parts of the assembly are also formed in automatic machines and are quite easily assembled and disassembled by merely disconnecting the end member and the closure member from each other. Thus, broken or worn parts may be readily replaced or repaired.

We have illustrated and described our improvements in an embodiment which we have found very practical. We have not attempted to illustrate or describe other embodiments or adaptations as it is believed this disclosure will enable those skilled in the art to embody or adapt our improvements as may be desired.

Having thus described our invention, what we claim as new and desire to secure by Letters Patent is:

1. The combination with a fishing reel frame comprising an end plate and a head plate having an opening therein and cooperating with said end plate to provide a chambered head, of a staff mounted on said end plate to project centrally through said opening, a thimble mounted in said opening in said head plate concentrically of said staff, a shaft having a longitudinal bore receiving said staff and rotatable thereon, said shaft being formed of stock of square cross section having portions of the corners thereof rounded providing an inner gear receiving portion and an outer crank receiving portion, said shaft having annular grooves at the inner ends of said gear and crank receiving portions, gears having central openings arranged on said gear receiving portion with one of the gears in supporting engagement with the shoulders resulting from the rounding of the corners of said portion, a split ring arranged in the groove at the inner end of said gear receiving portion and acting to retain the gears thereon, a second split ring arranged in the groove at the inner end of said crank receiving portion and providing an annular crank abutment, a crank arranged on said crank receiving portion in supporting engagement with said abutment, a collar disposed on said crank receiving portion at the outside of said crank, and a screw threaded into the outer end of said bore for securing the crank thereon.

2. The combination with a fishing reel frame comprising an end plate and a head plate having an opening therein and cooperating with said end plate to provide a chambered head, of a staff mounted on said end plate to project centrally through said opening, a thimble mounted in said opening in said head plate concentrically of said staff, a shaft rotatable on said staff, said shaft being formed of stock of square cross section having portions of the corners thereof rounded providing an inner gear receiving portion and an outer crank receiving portion, said shaft having annular grooves at the inner ends of said gear and crank receiving portions, gears having central openings arranged on said gear receiving portion with one of the gears in supporting engagement with the shoulders resulting from the rounding of the corners of said portion, a split ring arranged in the groove at the inner end of said gear receiving portion and acting to retain the gears thereon, a second split ring arranged in the groove at the inner end of said crank receiving portion and providing an annular crank abutment, a crank arranged on said crank receiving portion in supporting engagement with said abutment, and means clamping said crank upon said shaft.

3. The combination with a fishing reel frame, of a staff mounted on said frame, a thimble mounted on said frame concentrically of said staff, a shaft having a longitudinal bore receiving said staff and rotatable thereon, said shaft being formed of stock of square cross section having portions of the corners removed providing an inner gear receiving portion and an outer crank receiving portion, said shaft having annular grooves at the inner ends of said gear and crank receiving portions, gears having central openings arranged on said gear receiving portion with one of the gears in supporting engagement with the shoulders resulting from the removal of the corners of said portion, a split ring arranged in the groove at the inner end of said gear receiving portion and acting to retain the gears thereon, a second split ring arranged in the groove at the inner end of said crank receiving portion and providing a crank abutment, a crank, a collar disposed on said crank receiving portion at the outside of said crank, and a screw threaded into the the outer end of said shaft for securing the crank thereon.

4. The combination with a fishing reel frame, of a staff mounted on said frame, a thimble mounted on said frame concentrically of said staff, a shaft rotatable on said staff, said shaft being formed of stock of square cross section having portions of the corners removed providing an inner gear receiving portion and an outer crank receiving portion, said shaft having annular grooves at the inner ends of said gear and crank receiving portions, gears having central openings arranged on said gear receiving portion with one of the gears in supporting engagement with the shoulders resulting from the removal of the corners of said portion, a split ring arranged in the groove at the inner end of said gear receiving portion and acting to retain the gears thereon, a second split ring arranged in the groove at the inner end of said crank receiving portion and providing an annular crank abutment, a crank arranged on said crank receiving portion in supporting engagement with said abutment, and means clamping said crank upon said shaft.

5. The combination with a fishing reel frame, of a staff mounted on said frame, a shaft having a longitudinal bore receiving said staff and rotatable thereon, said shaft being formed of stock of square cross section having portions of the corners thereof rounded providing an inner gear receiving portion and an outer crank receiving portion, said shaft having annular grooves at the inner ends of said gear and crank receiving portions, gears having central openings arranged on said gear receiving portion with one of the gears in supporting engagement with the shoulders resulting from the rounding of the corners of said portion, a split ring arranged in the groove at the inner end of said gear receiving portion and acting to retain the gears thereon, a second split ring arranged in the groove at the inner end of said crank receiving portion and providing an annular crank abutment, a crank arranged on said crank receiving portion in supporting engagement with said abutment, a collar disposed on said crank receiving portion at the outside of said crank, and a screw threaded into the outer end of said shaft for securing the crank thereon.

6. The combination with a fishing reel frame, of a staff mounted on said frame, a shaft rotatable on said staff, said shaft being formed of stock of square cross section having portions of the corners thereof rounded providing an inner gear receiving portion and an outer crank receiving portion, said shaft having annular grooves at the inner ends of said gear and crank receiving portions, gears having central openings arranged on said gear receiving portion with one of the gears in supporting engagement with the shoulders resulting from the rounding of the corners of said portion, a split ring arranged in the groove at the inner end of said gear receiving portion and acting to retain the gears thereon, a second split ring arranged in the groove at the inner end of said crank receiving portion and providing an annular crank abutment, and a crank arranged on said crank receiving portion in supporting engagement with said abutment.

7. The combination in a fishing reel of a shaft having a longitudinal bore adapted to receive a supporting staff or spindle, said shaft being formed of stock of square cross section and having portions of the corners thereof removed providing an inner gear receiving portion with gear supporting shoulders at the outer ends thereof and an outer crank receiving portion, the shaft having annular grooves in the inner ends of said gear and crank receiving portions adapted to receive split rings.

SAMUEL G. RUSSELL.
EARLE D. CLICKNER.